L. MORGENTHAU.
Manufacture of Cigars, Cigarettes, &c.
No. 46,855. Patented March 14, 1865.
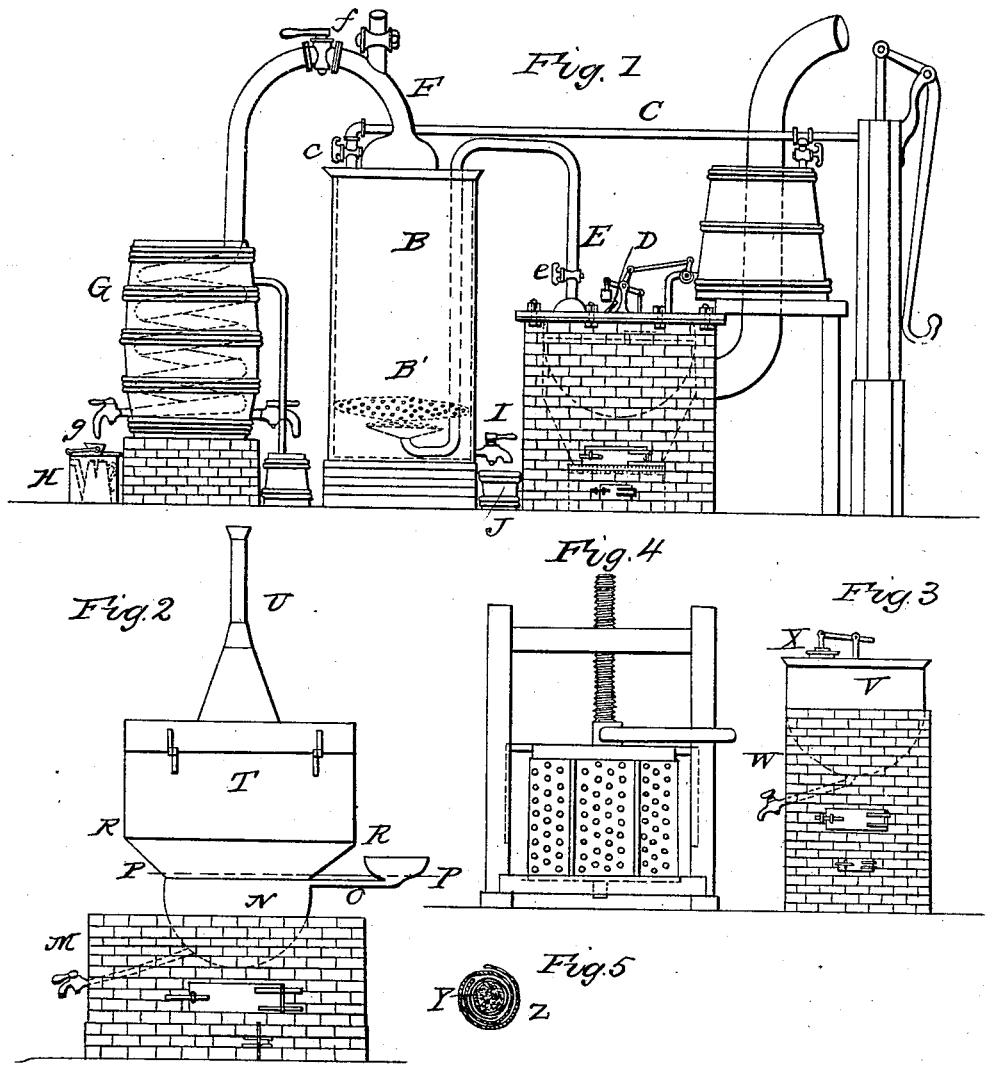

United States Patent Office.

LAZARUS MORGENTHAU, OF MANNHEIM, BADEN.

IMPROVEMENT IN THE MANUFACTURE OF CIGARS, CIGARETTES, &c.

Specification forming part of Letters Patent No. 46,855, dated March 14, 1865.

*To all whom it may concern:*

Be it known that I, LAZARUS MORGENTHAU, of Mannheim, in the Grand Duchy of Baden, have invented certain new and useful Improvements in the Manufacture of Cigars, Cigarettes, and Analogous Articles for Smoking; and I do hereby declare that the following is a full and exact description thereof, which is prepared with a view to the obtaining of Letters Patent therefor, the cigars to be called "Fichtennadel" cigars.

The accompanying drawings form a part of this specification.

Figure 1 is a side elevation of the apparatus which I employ for obtaining a preparation of pine-needle (fichtennadel) to be applied to the tobacco. Fig. 2 is a side elevation of the apparatus which I employ for treating the tobacco with the vapor of alcohol previous to the application of the pine-needle preparation. Fig. 3 is a side elevation of a boiler in which I boil the prepared tobacco with the pine-needle preparation in order to properly combine them. Fig. 4 is a press in which I force out the superfluous moisture from the tobacco after its removal from the boiler, and Fig. 5 a section of a cigar.

I saturate with a preparation of pine-needles or the young leaves and twigs of the pine-tree all the material which forms the interior or filling of a cigar, and I moisten with the same the interior surface of the leaf which forms the wrapper or exterior of the cigar. I leave the outer surface of the wrapper unsaturated.

The treatment of the tobacco with any of the pine-needle preparations to be described below imparts to it a very desirable fragrance, and the process frees the tobacco, in whole or in part, from the nicotine or poisonous principle which it ordinarily possesses. My cigars are in consequence more conducive to health and much more pleasant to use than ordinary cigars. The extract of young shoots and needles of the pine is prepared in the summer, when they possess their aromatic and medicinal properties in the highest degree. I extract their virtues by treating the cut or bruised material with steam in a manner analogous to that employed in extracting essential oil, extracts, decoctions, &c. In order to be able to manufacture such cigars in the winter season, a sufficient quantity of the oil or other preparation of pine-needle must be accumulated for the purpose during the season while the vegetation is in good condition. From April to September the pine-needle preparations may be manufactured either for immediate use or storage; but from September to April the previously-prepared material should alone be used. The treatment of the tobacco previous to the application of these preparations is very simple. The vapor of alcohol is allowed to permeate the mass and to flow away, changing or carrying away the nicotine and whatever volatile principles may be set free thereby. I apply the pine-needle extract to the tobacco by boiling them together, then remove the superfluous liquid by a press, dry the remaining material, and make it up into cigars, using for each a wrapper moistened with the preparation on the interior side only. I incase the entire cigar finally with tin-foil, which aids in preserving its aromatic properties.

I do not deem it indispensable to the success of my invention to employ the precise apparatus and quantities described below; but in order to enable others skilled in the art to make and use my invention I will proceed to describe the apparatus in detail, and to state generally the quantities which I consider most desirable I shall refer to the accompanying drawings, and to the letters of reference marked thereon. The shoots from pine-trees, after being gathered, are immediately chopped, put into a tub, and each hundred-weight of shoots mixed with two pounds of cooking-salt and one pound of Glauber's salt. In this state they remain for about thirty-six hours, which allows the acid they contain to develop itself. At the expiration of this period they are introduced into the vessel B through an opening, (not represented,) and are allowed to rest on the perforated plate B'. Water is pumped through the pipe C and cock $c$, and steam is then admitted from the kettle D through the pipe E and cock $e$.

I. *Preparation of the essence and oil.*—The steam, together with the volatile matter from the pine-shoots rising from the vessel B, is conveyed through the pipe F, and is condensed in a coil in the cooling apparatus G, and flows out through the cock $g$. The oil is separated from the watery portion, which I term "essence," by standing at rest for a time in a glass vessel, H, during which time the oil rises to the top, leaving the essence at the bottom.

II. *Preparation of the decoction.*—After a time the water is allowed to flow out, more or less saturated with the pine-needle properties in the form of a decoction, through the cock I, and is caught in the tub J, ready for immediate use.

III. *Preparation of the extract.*—The decoction not having sufficient strength to retain its properties for any great length of time, an extract is prepared to use during the winter months by simply boiling the decoction down in an ordinary kettle to the necessary strength.

IV. *Preparation of the tobacco.*—For the purpose of preparing the tobacco in a proper manner, I have constructed the apparatus shown in Fig. 1, and of which the following is a description: M is a brick furnace, and N a copper kettle mounted thereon. The latter is filled through the pipe O with alcohol, and kept filled to the line marked P P. This alcohol, on being heated in the kettle, rises in vapor and passes through the canvas net (the level of which is indicated by R) into the tobacco-chamber T. I provide a waste-pipe, U, through which alcoholic vapor with the volatile matter from the tobacco escapes to be discharged into the atmosphere, or to be condensed and recovered by means not represented.

V. *Application of the pine-needle preparation to the tobacco.*—After the tobacco has thus been moistened it is boiled with the fichtennadel (pine-needle) preparations. For this purpose I employ the apparatus shown in Fig. 3, which is constructed as follows: In the kettle V, over the furnace W, is placed all the tobacco intended to be used in the manufacture of the cigars, with the exception of the wrappers. Here it is boiled together with one or more of the fichtennadel preparations above described—to wit, the decoction, extract, essence, or oil. The safety-valve X allows the accumulating steam to escape, and thus avoid the danger of an explosion. After the boiling the tobacco is placed in the wooden press, Fig. 4, for the purpose of pressing out the superfluous preparation. The tobacco, after being pressed, is still too moist for use, and may be dried on hurdles. The quantities used by me at each boiling are as follows, one maas being equal to about 0.39627 gallons, and one pound being equal to about 1.1025 English pounds: one hundred and fifty pounds Baden (equal to one hundred and sixty-five pounds) of tobacco; fifty-five maas Baden (equal to one hundred and seventy-six pounds) of distilled water; thirty-two pounds Baden (equal to 35.2 pounds) fichtennadel decoction, or during the winter half that quantity of extract; ten maas Baden (equal to thirty-two pounds) fichtennadel-essence; three pounds Baden (equal to 3.3 pounds) fichtennadel-oil.

The wrapper Y, Fig. 5, is only dampened on the inner side of the leaf, so as to prevent a bitter taste, which the fichtennadel preparations would otherwise give it. Each cigar, when finished, is enveloped in tin-foil, Z, for the purpose of retaining its aromatic properties and to protect it from atmospheric influences.

The presence of the fichtennadel preparation in the tobacco is indicated in Fig. 5 by a red tint. The tin-foil is represented in blue with its thickness greatly exaggerated.

I do not confine myself to the absence of nicotine or to the presence of the metallic envelope; but,

Having now fully described my invention, what I claim as new therein, and desire to secure by Letters Patent, is as follows:

1. As a new article of manufacture, the fichtennadel cigars above described, the tobacco being partially filled with preparations derived from shoots of the pine-tree, substantially in the manner and with the effect herein set forth.

2. The fichtennadel preparations herein described, adapted for use in the manufacture of cigars, in the manner and for the purposes herein set forth.

In testimony whereof I have hereunto set my hand in the presence of two subscribing witnesses.

LAZARUS MORGENTHAU.

Witnesses:
 OTTO DILLMAR,
 GEORG. HÜTHER.